United States Patent
Baker et al.

(10) Patent No.: US 11,268,223 B1
(45) Date of Patent: Mar. 8, 2022

(54) GARMENT SLEEVE ATTACHMENT SYSTEMS AND METHODS

(71) Applicant: SoftWear Automation, Inc., Cumming, GA (US)

(72) Inventors: Michael J. Baker, Acworth, GA (US); Wael Saab, Atlanta, GA (US); Michael Patrick Small, Atlanta, GA (US); Santosh R. Yadav, Atlanta, GA (US); David Otto Konrad Mikolajewski, Niagara On The Lake (CA)

(73) Assignee: SoftWear Automation, Inc., Cumming, GA (US)

( * ) Notice: Subject to any disclaimer, the term of this patent is extended or adjusted under 35 U.S.C. 154(b) by 0 days.

(21) Appl. No.: 17/190,545

(22) Filed: Mar. 3, 2021

(51) Int. Cl.
| | |
|---|---|
| *D05B 19/16* | (2006.01) |
| *B25J 11/00* | (2006.01) |
| *B25J 15/00* | (2006.01) |
| *A41H 43/02* | (2006.01) |
| *A41H 43/04* | (2006.01) |
| *D05B 35/10* | (2006.01) |
| *D05B 27/00* | (2006.01) |

(52) U.S. Cl.
CPC ............. *D05B 19/16* (2013.01); *A41H 43/02* (2013.01); *A41H 43/04* (2013.01); *B25J 11/00* (2013.01); *B25J 15/0052* (2013.01); *D05B 27/00* (2013.01); *D05B 35/10* (2013.01)

(58) Field of Classification Search
CPC ...... D05B 21/007; D05B 27/10; D05B 35/06; D05B 39/00; D05B 19/16; D05B 27/00; D05B 35/10; D05B 21/00; A41H 43/02; A41H 43/04; B25J 15/02; B25J 15/0052; B25J 15/00

See application file for complete search history.

(56) References Cited

U.S. PATENT DOCUMENTS

| | | | | |
|---|---|---|---|---|
| 4,957,054 A | * | 9/1990 | Sakuma ................. | A41D 27/10 112/470.13 |
| 5,349,913 A | * | 9/1994 | Schramayr ............. | D05B 23/00 112/470.13 |
| 5,406,900 A | * | 4/1995 | Schramayr ............. | D05B 23/00 112/104 |
| 5,419,268 A | * | 5/1995 | Fyler ...................... | D05B 23/00 112/470.14 |
| 5,505,149 A | * | 4/1996 | Schramayr ............. | D05B 35/00 112/155 |
| 5,553,561 A | * | 9/1996 | Schramayr ............. | D05B 33/00 112/153 |

(Continued)

*Primary Examiner* — Nathan E Durham
(74) *Attorney, Agent, or Firm* — Thomas | Horstemeyer, LLP (57) ABSTRACT

Various examples are provided related to attachment of bands about a garment opening. In one example, among others, a sleeve band can be attached to a garment by loading the sleeve band on a band guide, aligning an opening of a garment over the sleeve band, and attaching the band to the garment along the edge of the opening. Alignment of the edges of the opening and the sleeve band can be maintained by ply aligners during attachment. In another example, a garment holding system includes a garment holder that can receive a garment and a band positioning system includes a band guide that can receive a band. Edges of the opening of the garment and the band can be controlled and maintained with ply aligners of the band positioning system.

20 Claims, 9 Drawing Sheets

(56) References Cited

U.S. PATENT DOCUMENTS

| | | | | |
|---|---|---|---|---|
| 5,555,833 | A | * | 9/1996 | Schramayr ............. D05B 33/00 112/470.31 |
| 5,638,998 | A | * | 6/1997 | Thompson ............. A41H 33/00 112/470.14 |
| 5,642,680 | A | * | 7/1997 | Thompson ............. D05B 33/00 112/470.14 |
| 5,642,681 | A | * | 7/1997 | Adamski, Jr. .......... D05B 19/12 112/155 |
| 5,676,078 | A | * | 10/1997 | Adamski, Jr. .......... D05B 19/12 112/475.03 |
| 5,806,449 | A | * | 9/1998 | Schramayr ............. D05B 35/10 112/470.29 |

\* cited by examiner

GARMENT SLEEVE ATTACHMENT SYSTEMS AND METHODS

BACKGROUND

In garment production, attaching a sleeve to an opening of the garment is one of the most difficult operations. The closed loop of the sleeve band offers specific challenges. In manual sewing operations, maintaining consistent stretching of the sleeve band and garment material while keeping the sleeve band aligned with the garment opening during sewing is a skill that takes time to master. For fully automated processes, this process is complicated by the multidimensional seam. In addition, the edge of the sleeve band may have varying curvature which increases the difficulty of alignment with the garment opening. Control of the different variables can present complications that can prevent consistent product production.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to automation of sewing or bonding using robots. Reference will now be made in detail to the description of the embodiments as illustrated in the drawings. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
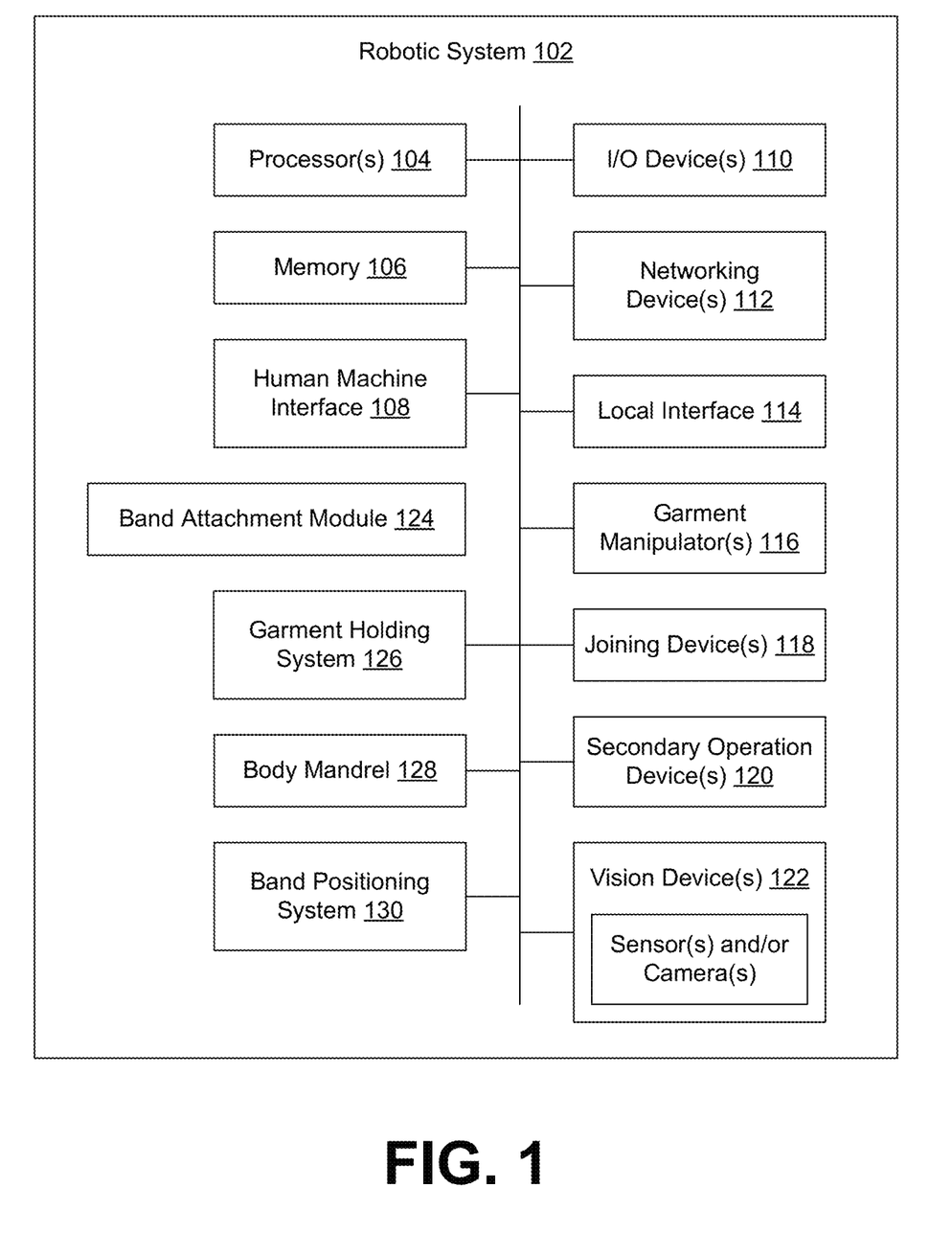
FIG. 1 illustrates an example of a garment band attachment system, according to various embodiments of the present disclosure.

Referring to FIG. 1, shown is an example of a system that can be used for attachment of sleeve bands or other clothing bands around openings in garments. In the context of this disclosure, a garment refers to garments or portions of garments being processed by the system for the attachment of the bands. The system is described in the context of attachment of sleeve bands but the system can also be used for attachment of other bands to a garment. For example, the system can be used to attach leg bands or neck bands around garment openings or can be used to attach different bands of material around a torso of the garment (e.g., like a rugby shirt). A sleeve band is a closed loop of varying width. The sleeve band can be joined along a seam to form the loop or can be formed as a continuous band. Garment openings include, e.g., openings located at the shoulders of the garment. The openings include a continuous edge which can include changes in curvature, local discontinuities, and/or angled bends or corners. For example, the bottom of sleeve openings can have an angled V-shape.

As illustrated in the example of FIG. 1, the system can comprise a robotic system 102, which can include a processor 104, memory 106, an interface such as, e.g., a human machine interface (HMI) 108, I/O device(s) 110, networking device(s) 112, and a local interface 114. The robotic system can also include garment manipulator(s) 116, a joining device 118, secondary operation device(s) 120, and/or vision device(s) 122. The vision device(s) 120 can comprise a sensor or camera such as, e.g., an RGB camera, an RGB-D camera, a near infrared (NIR) camera, stereoscopic camera, photometric stereo camera (single camera with multiple illumination options), etc. Additionally, the robotic system 102 can include garment holding system 126, body mandrel 128, and/or band positioning system 130, which may be utilized in the processing of the garments.

The robotic system 102 can position, e.g., a sleeve band with respect to a corresponding garment opening while the sleeve band is attached around the garment opening by the joining device 118. A garment on the garment holding system 126 can be advanced to position an edge of an opening with respect to and edge of a sleeve band on the band positioning system 130. The edges can be aligned or overlapped for joining. When in in the appropriate locations, positioning of the garment opening can be controlled with respect to the sleeve band and or the joining device while the edges are being joined together. The garment holding system 126 can reposition the garment for attachment of a second sleeve band. When the joining (e.g., sewing or bonding) is complete, the processed garment can be removed from the garment holding system 126, e.g., by separating the garment holding system 126 from the band positioning system 130. The sleeve bands and garment can be manually loaded on and/or removed from the garment holding and band positioning systems 126 and 130. In more fully automated processes, the garment manipulator(s) 116 can be used to autonomously insert and/or remove the sleeve band and garment on the garment holding and band positioning systems 126 and 130.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a graphical user interface (GUI), a human machine interface (HMI), a voice interface, or a web-based user-interface.

The input/output devices or I/O devices 110 of the robotic system 102 can comprise components used to facilitate connections of the processor 104 to other devices such as, e.g., garment manipulator(s) 116, joining device 118, secondary operation device(s) 120, vision device(s) 122, garment holding system 126, body mandrel 128, and/or band positioning system 130 and can, for instance, comprise one or more serial, parallel, small system interface (SCSI), universal serial bus (USB), IEEE 1394 (i.e. Firewire™), or other appropriate connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The local interface 114 of the robotic system 102 can be, for example, but not limited to, one or more buses or other wired or wireless connections, as is known in the art. The local interface 114 can have additional elements, which are omitted for simplicity, such as controllers, buffers (caches), drivers, repeaters, and receivers, to enable communications. Further, the local interface 114 can include address, control, and/or data connections to enable appropriate communications among the components.

The garment manipulator(s) 116 of the robotic system 102 can facilitate positioning or installing the product material(s) in preparation for and/or after the joining operations. For example, the sleeve band can be positioned or installed on the band positioning system 130 using one or more end effector on, e.g., an industrial robot or other actuator (e.g., pneumatic or servo actuators) or appropriate manipulation assembly. Industrial robots include, e.g., articulated robots, selective compliance assembly robots (SCARA), delta robots, and cartesian coordinate robots (e.g., gantry robots or x-y-z robots). Industrial robots can be programmed to carry out repetitive actions with a high degree of accuracy or can exhibit more flexibility by utilizing, e.g., machine vision and machine learning. The garment body can also be positioned or installed on the garment holding system 126 using end effectors on an industrial robot or other manipulator or appropriate manipulation assembly. The garment manipulator(s) 116 can also be used to remove the processed garment from, e.g., the garment holding system 126.

The joining device 118 of the robotic system 102 facilitates joining (e.g., sewing or bonding) the product materials together and can be configured to join a perimeter of a sleeve band to a garment opening. The joining device 118 can include, e.g., a sewing machine or a bonding apparatus (e.g., ultrasonic welding, thermal bonding, gluing or other bonding or joining technology). For example, a cylinder bed overlock sewing machine or other sewing machine (e.g., chain stitch, lock stitch, two needle versions of each, etc.) can be used. The joining device 118 can be configured to sew or otherwise bond or join (e.g., ultrasonic welding) material together along a perimeter or other defined path. The joining device 118 can sufficiently combine the sleeve band and garment such that they remain connected through the intended life of the garment. A feed assembly of the joining device 118 can be used to control the feed of material through the joining device 118. For example, a feed dog of a sewing machine, a welding mechanism of an ultrasonic welder, belts, rollers or other feeding methods can be used. In addition, the joining device 118 can include a knife device (e.g., a tail knife or chain cutter) or other separation device in order to cut or sever the joining medium such as, e.g., threads, stitches, materials from the workpiece etc.

The secondary operation device(s) 120 can include stacking device(s), folding device(s), label manipulation device(s), and/or other device(s) that assist with the preparation, installation, removal and/or finishing of the processed product.

The vision device(s) 122 of the robotic system 102 can facilitate detecting the movement of the product material(s) and inspecting the product material(s) for defects and/or discrepancies during a joining operation. A vision device 122 can comprise sensor(s) and/or camera(s) such as, but is not limited to, an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc.

A band attachment module 124, when executed by the processor 104, can control the robotic system to implement attachment of a sleeve band to a garment. The garment holding system 126 can control positioning and rotation of a garment (e.g., a shirt) for attachment of the sleeve band to a garment by the joining device 118. The body mandrel 128 can be used to move and position an opening of the garment on the garment holding system 126 for alignment with the sleeve band for sewing.

The band positioning system 130 can control positioning and movement of a sleeve band for attachment to a garment body by the joining device 118. The band positioning system 130 can provide proper alignment of an edge of the garment opening with respect to an edge of the sleeve band during attachment to the garment. The band positioning system 130 can ensure appropriate rotation and tensioning of the band with respect to the opening to secure the sleeve band to the garment as will be discussed.

Functioning of a garment holding system 126 will now be discussed with reference to the example of FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
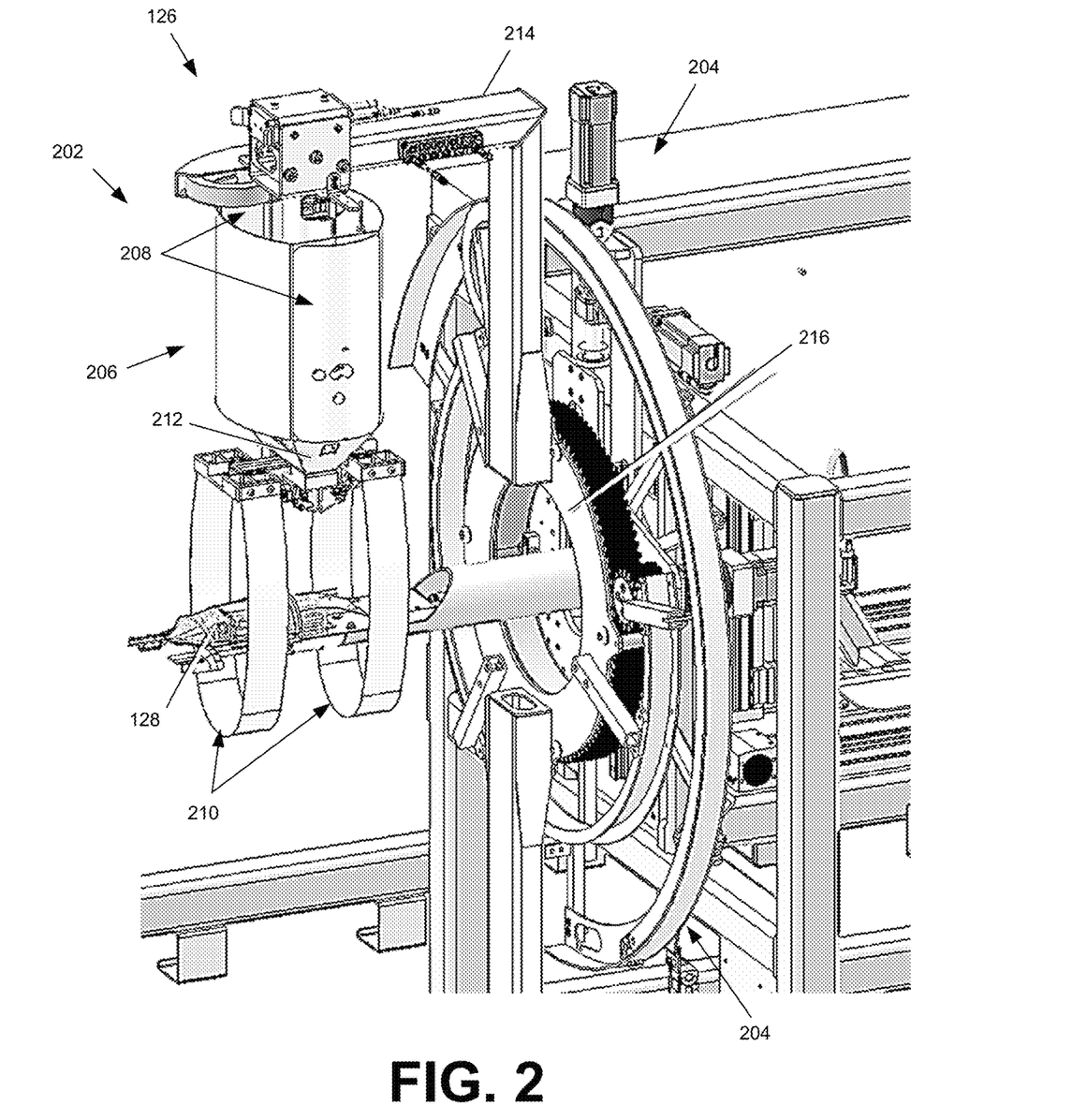
FIG. 2 illustrates an example of a garment holding system, according to various embodiments of the present disclosure.

FIG. 2 illustrates an example of a garment holding system 126 that can facilitate attachment of a sleeve band to an opening in a garment. The garment holding system 126 comprises a body holder 202 configured to hold a garment (e.g., shirt) in position for attachment of the sleeve band about a corresponding opening of the garment. The body holder 202 is supported by a rotary axis assembly 204, which is configured to rotate the body holder 202 about a rotational axis that is substantially perpendicular to the feed or sewing direction of the joining device 118. In the example of FIG. 2, the rotational axis is oriented horizontally, but other orientations can be used based on the positioning of the joining device 118. The body mandrel 128 can extend along the horizontal axis through the rotary axis assembly 204 and a garment on the body holder 202 to facilitate attachment of a sleeve band to the garment.

The body holder 202 can include a body section 206 comprising a plurality of wings 208 (e.g., 2, 3, 4, etc.) distributed about a longitudinal axis of the body holder 202. The wings 208 can be adjusted to extend outward or retract inward for engagement with the garment. The wings 208 can be extended outward to contact an internal surface of the garment oriented for support during attachment of the sleeve band using, e.g., pneumatic, servo or other appropriate actuators. The inner surface contacted by the wings 208 may be the inner surface of the finished product or the outer surface of the finished product. For example, the garment may be turned inside out to facilitate attachment of the sleeve band. In that case, the inner surface contacted by the wings 208 will be the outer surface of the finished product. Extension of the wings 208 can be individually controlled or can be controlled as a group to change the effective circumference of the body holder 202, allowing the loading of various size garments. For example, two or more wings 208 can extend outward (e.g., on opposite or different sides) from a longitudinal axis of the body holder 202. The surface of the wings 208 can be textured or comprise a coating or material that improves the frictional contact with the garment surface.

In some embodiments, the wings 208 can comprise garment body rollers that are located to engage with an internal surface of the garment and configured to rotate the garment around the body holder 202. The garment body rollers can be driven at a controlled speed by, e.g., servomotors or stepper motors. The wings 208 can be adjusted to extend or retract the garment body rollers for engagement with the garment. The position of the wings 208 and/or garment body rollers may be adjusted along the length of the body holder 202. In other embodiments, the body holder 202 can utilize other garment support configurations. For example, support rods can be extended through the garment for positioning.

Body supports 210 can be located at a distal end 212 of the body section 206 and can provide support of the garment fabric about the opening(s) to aid in insertion of the body mandrel 128 and during rotation of the body holder 202 for sleeve band attachment. For example, the body supports can use hoops to provide support for the garment during loading, insertion and removal of the body mandrel, and during joining of the band. The body section and/or the wings 208 can move with respect to the body supports 210. The body supports 210 can be actuated to accommodate different garment sizes and gain control over the garment. The garment can be pulled taught to the body supports 210, providing tension in the garment and causing the garment openings of interest to be held in an open state for insertion of the body mandrel 128. The body supports 210 can be actuated to move outwards (away from each other) to further tension the garment and stabilize the openings. The length of the hoops of the body supports 210 may be adjusted to accommodate various garment sizes. In other embodiments, the body supports 210 can move with respect to the longitudinal axis of the body holder 202. The positioning of the body supports 210 can be independently controlled from positioning of the wings 208. Inflatable members may be used to tension the garment at the opening and/or around the circumference of the body holder 202.

In some embodiments, the body supports 210 can be implemented as arms that can extend from the body holder 202 to shape and hold the garment and its openings in position for insertion of the body mandrel 128 and the sleeve band. The arms can be rigid or flexible. For example, the arms can be shaped to conform to the shape of the garment for tensioning or can flex against the internal surface to tension the garment. The garment can be pulled taught to the arms, providing tension in the garment and causing the garment openings of interest to be held in an open state for insertion of the body mandrel 128. The arms can extend to accommodate different garment sizes and gain control over the garment. In other embodiments, the body supports 210 can be implemented using handling devices such as, e.g., air flow, vacuum, or mechanical gripping (e.g., a clamp, pinching, pins, or needles) electro-adhesion, adhesion, electrostatic forces, freezing, brush, or hook and loop) which can expand or grip onto an internal or external surface of the garment to tension the garment for insertion of the body mandrel 128 and the sleeve band.

The body holder 202 is supported at a proximal end by a rotary arm 214 of the rotary axis assembly 204. The rotary arm 214 is coupled to a rotary actuator 216 that allows for controlled rotation (e.g., about 360-degrees or more) about the horizontal axis to facilitate joining of the sleeve band about the opening in the garment. For example, at the end of the seam it may be desirable to partially overlap the start of the seam to secure the seam and prevent unraveling. This action would require a rotation of more than 360-degrees. In some embodiments, the position of the rotary arm 214 can be radially adjusted (e.g., vertically, horizontally or a combination thereof) to vary the position of the body holder 202. In other embodiments, the rotary actuator 216 and/or the rotary axis assembly 204 can be moved (e.g., vertically and/or horizontally) to reposition the body holder 202. The rotary actuator 216 can comprise a gear, timing belt or other appropriate actuation mechanism that facilitates the rotational movement. As shown in FIG. 2, the body mandrel 128 can be extended through the ring gear and the garment hoops. The body supports 210 can tension the garment openings to allow the body mandrel 128 to align with and pass through the openings of the garment on the body holder 202 as will be discussed. After insertion of the body mandrel 128, tension applied to the garment material by the body supports 210 can be released to allow the garment material to relax for alignment of the edges during the joining process.

In some embodiments, the rotary arm 214 can be configured to pivot a portion of the rotary arm 214 and the body holder 202 outward to allow access to the body holder 202. For example, with the body mandrel 128 retracted and the rotary axis assembly rotated 90-degrees with the longitudinal axis of the body holder 202 substantially horizontal, the rotary arm 214 can be hinged and actuated to pivot the section attached to the body holder 202 outward so that the longitudinal axis of the body holder 202 is substantially parallel with the horizontal axis of the rotary axis assembly 204. This horizontal orientation can facilitate, e.g., garment loading onto and removal from the body holder 202 and maintenance or replacement of the body holder 202.

The proximal end of the body holder 202 can be configured to rotate the body section and body supports 210 about the longitudinal axis of the body holder 202. The body holder 202 can be rotated about 180-degrees around the longitudinal axis to allow access to openings on opposite sides of the garment. In some cases, the rotation of the body holder 202 may be biased towards the front of back of the sleeve band (e.g., less than or more than 180-degrees). For example, the body holder 202 can position the garment to allow the body mandrel 128 to extend through the garment openings to facilitate insertion and attachment of a first sleeve band. The body mandrel 128 can then be retracted and the body holder 202 rotated about the longitudinal axis of the body holder 202 to allow the body mandrel 128 to extend through the garment openings to facilitate insertion and attachment of a second sleeve band to the other opening. After the garment has been rotated, the body mandrel 128 is extended through the first sleeve band attached to the garment to enable attachment of the second sleeve band to the other garment opening. The proximal end of the body holder 202 can also be configured to adjust the radial position of the body holder 202 along the longitudinal axis with respect to the radial arm 214. This can allow adjustment of the body holder position without adjusting the position of the radial arm 214.

Functioning of a body mandrel 128 will now be discussed with reference to the example of FIGS. 3A-3C. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
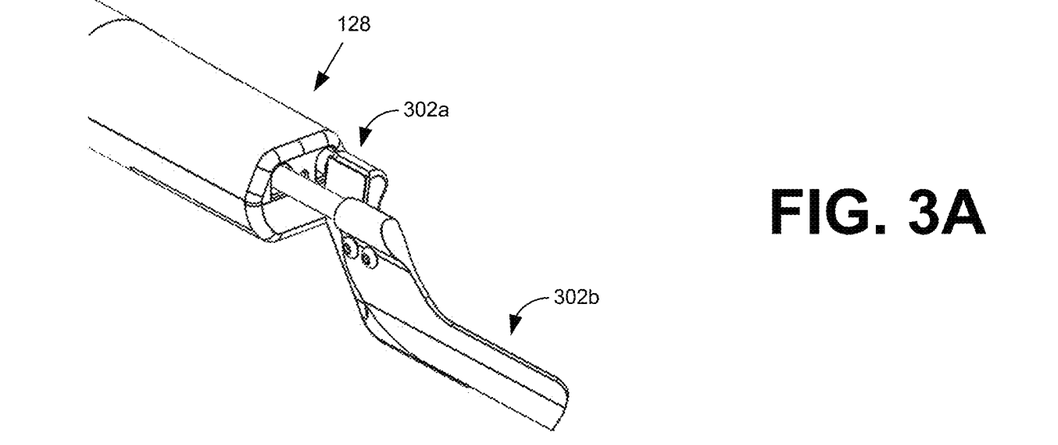
FIGS. 3A-3C illustrate an example of a body mandrel, according to various embodiments of the present disclosure.
Figure 3B:
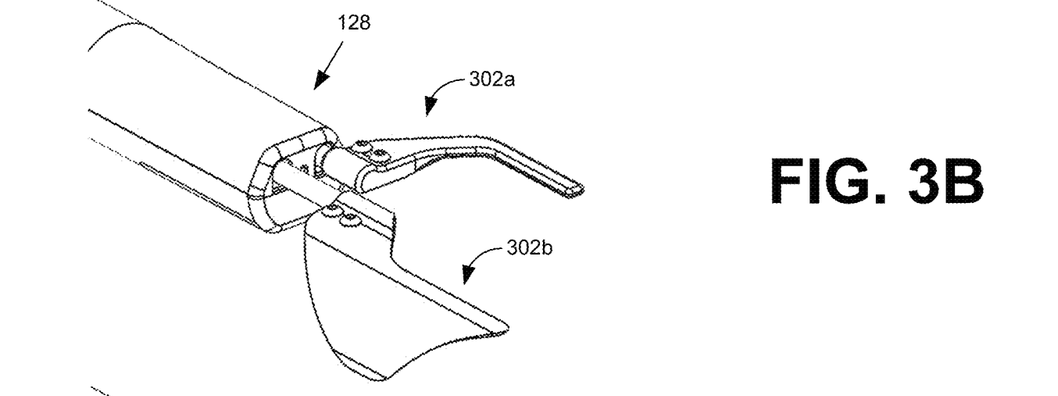
Figure 3C:
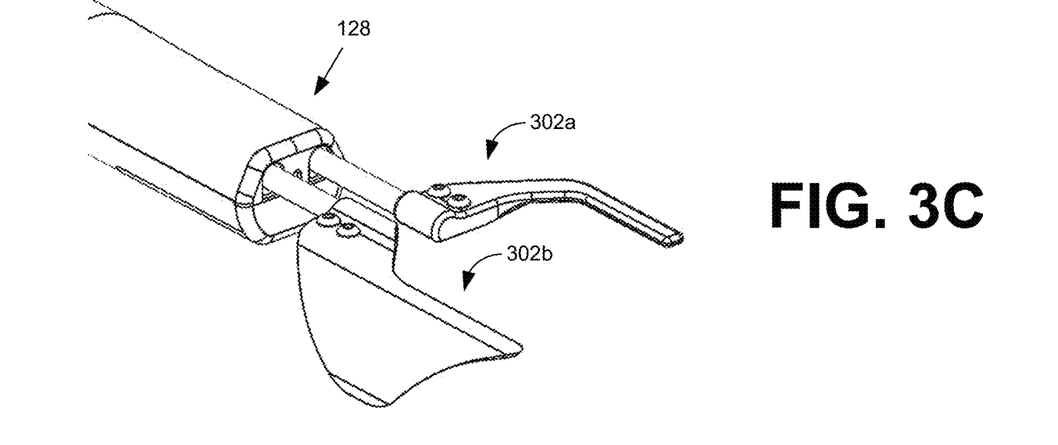

FIGS. 3A-3C illustrate an example of a body mandrel 128 that can facilitate attachment of a sleeve band to an opening in a garment. The body mandrel 128 comprises an elongated body having a distal end configured to be extended through the rotary axis assembly 204 and openings of the garment on the body holder 202. Actuators at a proximal end can control vertical, horizontal and/or axial movement of the body mandrel 128 and combinations thereof. The body mandrel 128 comprises body mandrel wings 302 at the distal end, which can deploy to assist in holding the opening shape for insertion of a sleeve band as well as maintain separation between the garment and the sleeve band during sewing. FIG. 3A shows the body mandrel wings 302 in a folded (or retracted) position. The body mandrel wings 302 fold against and/or overlap each other to provide a reduced cross-sectional area for insertion through the garment opening or through an attached sleeve band. In the example of FIG. 3A, the body mandrel wings 302 have a portion that is offset from the longitudinal axis of the body mandrel 128. A first body mandrel wing 302a is retracted further than a second body mandrel wing 302b. This configuration can minimize catching or snagging on the garment material.

When the distal end of the body mandrel 128 extends through the garment opening on the side of the garment opposite the rotary axis assembly 204, the body mandrel wings 302 can be unfolded (or radially extended) as shown in FIG. 3B, shaping the opening and tensioning the material around the opening. To assist with opening and tensioning the material, one or more of the body mandrel wings (e.g., 302a) can be axially extended and opened outward as it is unfolded or can be axially extended after being radially opened as shown in FIG. 3C. The curvature of the body mandrel wings 302 can control the opening size and shape for insertion of the sleeve band. In this position, the body mandrel wings 302 can hold the opening of the garment in position for insertion of a sleeve band as will be discussed. The body mandrel wings 302 also provide a surface between the sleeve band and garment opening that can be used to adjust positioning of the edge of the sleeve band and/or the edge of the garment opening during the joining process. The body mandrel wings 302 can be returned to the folded (or retracted position) to remove the body mandrel 128 from the garment. In some embodiments, the garment can be pressurized or inflated with air or other appropriate gas to hold the garment opening in position. In some embodiments, the body supports 210 can include hoop wings that can shape the openings and tension the material around the openings, and provide the surface between the sleeve band and garment opening, thereby removing the need to unfold the body mandrel wings 302.

Functioning of a band positioning system 130 will now be discussed with reference to the example of FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
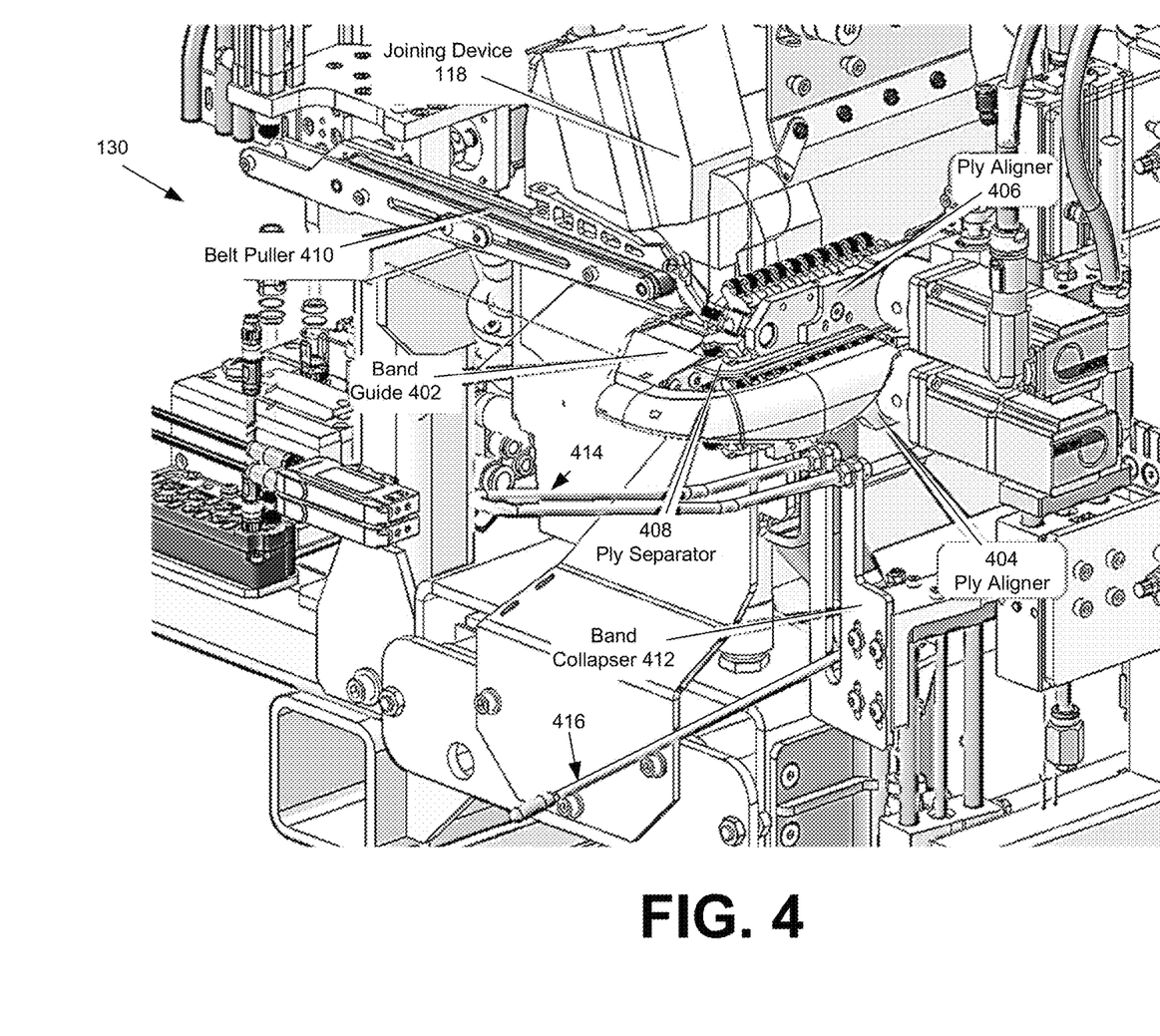
FIG. 4 illustrates an example of a band positioning system, according to various embodiments of the present disclosure.

FIG. 4 illustrates an example of a band positioning system 130 that can facilitate attachment of a sleeve band to an opening in a garment by a joining device 118. The band positioning system 130 can comprise, e.g., a band guide 402, a bottom ply aligner 404 and a top ply aligner 406 separated by a ply separator 408, a belt puller 410, and/or a band collapser 412. The band guide 402 can comprise a shaped surface mounted with respect to a feed assembly (e.g., adjacent to a feed dog and a presser foot) of the joining head that can guide the sleeve band into proper orientation with the feed assembly (e.g., into the gap between the presser foot and the feed dog) and provide a surface upon which the sleeve band rides during joining to maintain its desired shape, prevent wrinkles, etc. The ban guide 402 can comprise a sloped or curved surface that facilitates loading the sleeve band.

The band guide 402 can include air jets or orifices configured to direct air to guide the sleeve band material as it is advanced over the band guide 402 and during attachment. The air jets or orifices can be configured to direct air in one or more directions along the internal surface of the sleeve material to facilitate positioning and attachment of the sleeve band. For example, air jets or orifices can direct air through the internal length of the sleeve band, away from the feed assembly, to extend the sleeve bend which can assist in insertion of the sleeve band into the garment opening. Air jets or orifices can also direct air in the feed direction to facilitate movement and tensioning of the sleeve band material during attachment to the garment. In addition, one or more air jets can be directed in the feed direction to assist in movement of the sleeve band on the surface of the band guide 402. For example, the air jets can help separate the sleeve band material from the surface of the band guide 402 to prevent bunching of the material as it is joined.

The band positioning system 130 can maintain proper alignment of the garment opening with the sleeve band for sewing or bonding. Alignment of the opening with the sleeve band can be accomplished using the bottom and top ply aligners 404 and 406. Ply aligners 404 and 406 can provide traction in one direction to control positioning of the material in that direction, while concurrently allowing movement of the material in a perpendicular direction. For example, the ply aligners 404 and 406 can comprise a series of rollers that operate as idlers in the feed direction of the joining device 118, while providing controlled movement of the sleeve band and garment material. In the example of FIG. 4, movement of the rollers about the bottom ply aligner 404 can shift the material of the sleeve band from side-to-side on a bottom surface of the ply separator 408 and the top ply aligner 406 can shift the garment material from side-to-side on a top surface of the ply separator 408 to keep the edge of the garment opening substantially aligned with the edge of the sleeve band during the joining (e.g., sewing or bonding) process as the sleeve band and garment material are feed into the joining head. Positioning of the ply aligners 404 and 406 against the material or away from the ply separator 408 can be provided by pneumatic, servo or other appropriate actuator.

The ply aligners 404 and 406 can include, but are not limited to, omni-chain material aligners or omni-belt material aligners. An omni-chain material aligner can comprise a circular roller chain extending between two or more sprockets. The rollers of the circular roller chain can provide rolling contact in the feed direction while providing traction in a substantially perpendicular direction. The sprockets can be driven by a motor (e.g., a servomotor or stepper motor) to perform active steering control of the material. FIG. 4 illustrates an example of omni-belt material aligners comprising a belt (e.g., an indexed belt, chain, etc.) with attached perpendicular rollers, which allow movement of the material in the feed direction and active motorized steering control of the material across the width of the band. In FIG. 4, the rollers are offset from the belt to provide contact with the garment material. Additional details about material aligners are provided in U.S. patent application Ser. No. 16/984,815, entitled "Material Aligner" and filed on Aug. 4, 2020, which is hereby incorporated by reference in its entirety. In other embodiments, an omni-wheel which can be driven in one or two directions may be used to provide control of the garment material being fed into the joining head. In some embodiments, a contact surface similar to a feed dog can be used to temporarily contact and shift the sleeve band and/or garment material substantially perpendicular to the feed direction of the joining head.

Edge sensors can be used to monitor the positioning and alignment of the opening edge of the garment and the edge of the sleeve band. For example, the edge sensors can include a fiber optic array, vision device, mechanical sensor, or other appropriate sensor. The edge sensors can monitor the locations of the sleeve band and garment opening edges, which can be used to control the ply aligners 404 and 406 to maintain the edges in the proper position.

As shown in FIG. 4, the band guide 402 can partially surround the bottom ply aligner 404 to guide the sleeve band through the feed assembly of the joining device 118 and around the bottom ply aligner 404. As a sleeve band is loaded onto the band guide 402, the bottom ply aligner 404 can engage with the sleeve band to pull it over the band guide 402 and under the ply separator 408. The bottom ply aligner 404 can position the edge of the sleeve band for joining with the garment. With the bottom ply aligner 404 located on one side of the band guide 402, the sleeve band may need to be adjusted on the other side for proper edge alignment. For example, the belt puller 410 can be used to move the sleeve band along that side of the band guide 402. The belt puller 410 is configured to help pull the material through the feed assembly to prevent bunching during processing. In some embodiments, the belt puller 410 can also be extended outward from the joining device 118 and rotated downward to contact with the sleeve band. The belt puller 410 can then be retracted back towards the joining device 118, while maintaining contact with the sleeve band, to assist in loading the sleeve band onto the band guide 402. In some embodiments, the band guide 402 can include contact surfaces similar to a feed dog or belts/rollers along the edge to facilitate loading of the sleeve band onto the band guide 402 or to control the edge of the sleeve band during sewing.

The band collapser 412 can be provided to support and reduce the cross-sectional area of the sleeve band for insertion into the opening of the garment. In the example of FIG. 4, the band collapser comprises an upper guide bar 414 in a fixed position below the band guide 402 and a movable lower collapsing bar 416 located below the upper guide bar 414. The upper guide bar 414 is inserted through the sleeve band as it is loaded onto the band guide 402. When the sleeve band is in position on the band guide 402 (as detected by one or more sensors), the lower collapsing bar 416 moves upward toward the upper guide bar 414. This motion catches the sleeve band material hanging below the band guide 402, causing it to collapse against the upper guide bar 414 and reducing the cross-sectional area of the sleeve band. It this condition, the collapsed sleeve band can be inserted into the opening of the garment. The lower collapsing bar 416 can be removed after insertion of the sleeve band into the opening to allow the sleeve band to move freely about the upper guide bar 414.

Where the sleeve band includes a seam, it can be positioned on the band guide 402 for proper alignment with the garment opening. A band seam detector can include a sensor (e.g., a proximity sensor) that can detect the seam in the band as it passes by the sensor. Rotation of the sleeve band around the band guide 402 can be controlled (e.g., via the belt puller 410) to position the seam at a desired location.

With the sleeve band in position on the band guide 402, the opening of the garment can be positioned over the sleeve band for joining. As previously discussed, the body mandrel 128 is extended through the openings of the garment, and the body mandrel wings 302 are unfolded to hold the edge of the opening for alignment with the edge of the sleeve band. The sewing device 118 and band positioning system 130 can be advanced toward the garment holding system 126 to insert the sleeve band through the garment opening and align the edge of the opening with the edge of the sleeve band for joining. Alternatively, the garment holding system 126 and body mandrel 128 can be advanced toward the band positioning system 130, e.g., by moving along the horizontal length of the rotary arm 214 (FIG. 2) for joining.

To place the edge of the garment opening in the proper position on the body mandrel wings 302 for positioning over the sleeve band, the belt puller 410 can be extended outward from the joining device 118 and rotated downward to contact with the sleeve band on the mandrel wing 302. The belt puller 410 can then be retracted back towards the joining device 118 or moved forward towards the body holder 202, while maintaining contact with the sleeve band, to assist in sliding the edge of the sleeve band on the body mandrel wings 302. When the edge is in position on the body mandrel wings 302 (e.g., as detected by a sensor), the joining device 118 and band positioning system 130 can be further advanced to position the edge of the garment opening over the sleeve band for alignment.

The top ply aligner 406 can be used to drive the garment material over the ply separator 408 and through the feed assembly of the joining head until the edge of the opening is aligned with the edge of the sleeve band. A sensor can be used to monitor the position of the edge of the opening and to control operation of the top ply aligner 406. Once the edges of the sleeve band and garment opening are in proper position, they can be joined together by the joining device 118. As the joined edge rotates about the band guide 402 and returns to the ply aligners 404 and 406, the ply aligners 404 and 406 can be moved away from the material and the ply separator 408 can be retracted to allow the joined edge to be completed.

Functioning of the garment holding system 126, body mandrel 128, and band positioning system 130 will now be explained with reference to FIGS. 5A-5D. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5A:
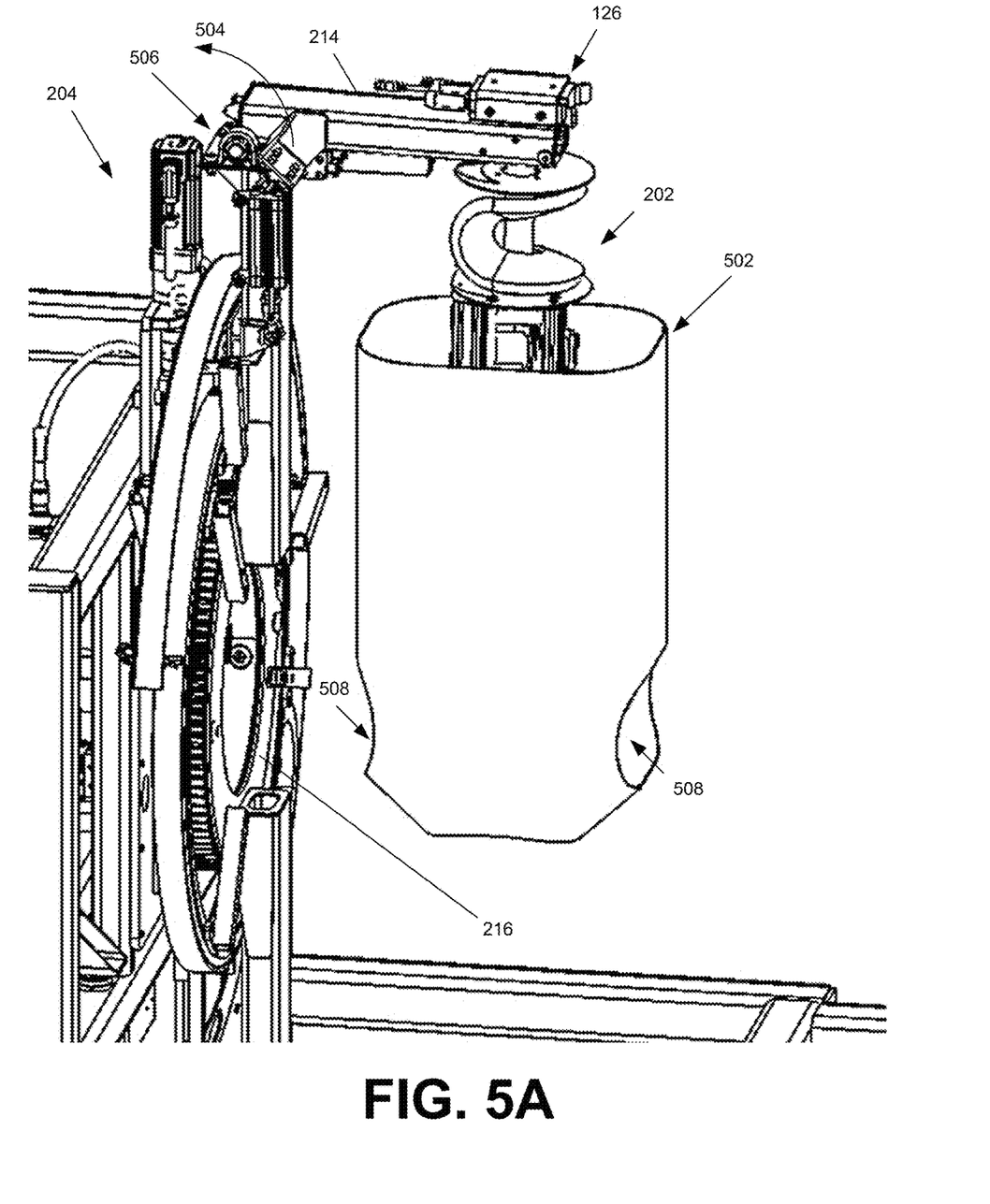
FIGS. 5A-5D illustrate an example of the body mandrel of FIG. 3 adjusting a garment on the garment holding system of FIG. 2 for attachment to a sleeve band by the band positioning system of FIG. 4, according to various embodiments of the present disclosure.

Referring to FIGS. 5A-5D, operation of the garment holding system 126, body mandrel 128 and band positioning system 130 is illustrated. As shown in FIG. 5A, a garment 502 is initially loaded on the body holder 202 of the garment holding system 126. The garment can be manually loaded onto the body holder 202 by an operator or user or can be autonomously loaded onto the body holder 202 by a garment manipulator 116. In the example of FIG. 5A, the rotary arm 214 can be configured to rotate (as shown by arrow 504) a portion of the rotary arm 214 and the body holder 202 outward about a pivot point 506 (e.g., a hinged connection) to allow access to the body holder 202. The pivot point can be driven by, e.g., an electric or pneumatic mechanism. Positioning the body holder 202 in a horizontal position outside the radius of the garment holding system 126 can provide easier access for the installation of the garment on the body holder 202.

With the garment located over the body holder 202, the wings 208 can be extended outward from the body holder 202 to engage with the inner surface of the garment 502 to hold it in position on the body holder 202. The body supports 210 can then be positioned to engage with the garment 502 to provide tension in the garment 502 causing the openings 508 to be held in an open state for insertion of the body mandrel 128. The body supports 210 can be actuated to move outwards (away from each other) to further tension the garment 502 and stabilize the openings. With the garment 502 loaded on the body holder 202, it can be rotated back into position as shown in FIG. 5A with the garment openings 508 located for insertion of the body mandrel 128. The position of the body holder 202 can be adjusted (e.g., vertically, horizontally or a combination thereof) for alignment with the body mandrel 128. The position of the body mandrel 128 can also be adjusted (e.g., vertically, horizontally or a combination thereof) for alignment with the garment openings 508). The position of the rotary arm 214 can be varied with respect to the rotary actuator 216, or the rotary actuator 216 and/or the rotary axis assembly 204 can be moved (e.g., vertically and/or horizontally) to reposition the body holder 202 to align the garment openings 508 with the body mandrel 128.

Figure 5B:
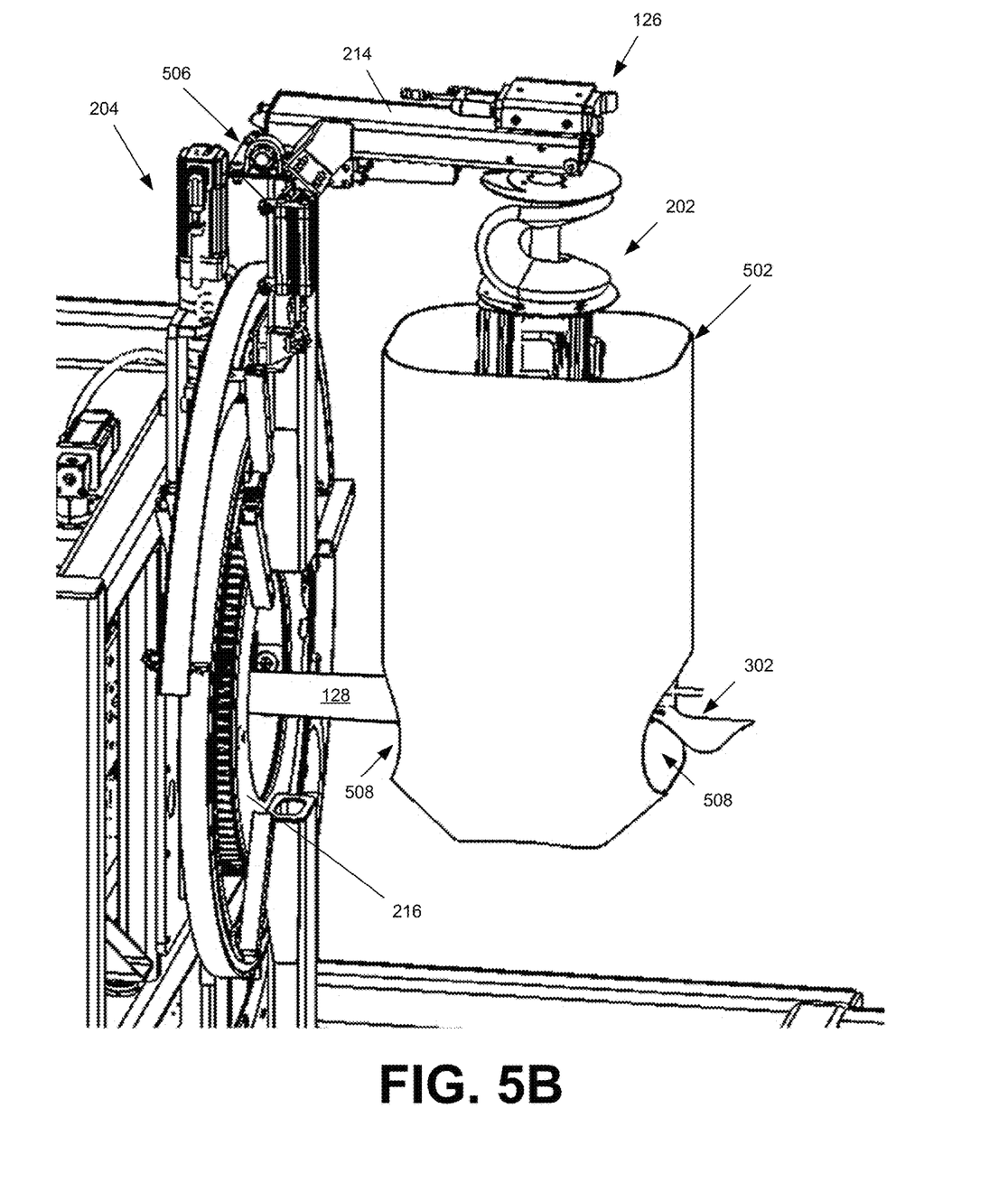

With the garment 502 in position, the body mandrel 128 is extended through the openings 508 as illustrated in FIG. 5B. The body mandrel 128 is moved parallel (or substantially parallel) with the horizontal axis about which the body holder 202 is rotated by the rotary axis assembly 204 and through the nearest garment opening 508 until the body mandrel wings 302 at the distal end extend through the opposite opening 508. The body mandrel wings 302 fold against and/or overlap each other to provide a reduced cross-sectional area for insertion through the garment openings 508 (see, e.g., FIG. 3A). The mandrel wings 302 can be unfolded (or radially extended) as shown in FIG. 3B, shaping the opening and tensioning the material around the opening. To assist with opening and tensioning the material, one or more of the body mandrel wings 302 can extend axially and open outward as shown in FIG. 3C to hold the opening 508 of the garment 502 in position for insertion of, e.g., a sleeve band. The curvature of the body mandrel wings 302 can control the opening size and shape for insertion of the sleeve band.

Figure 5C:
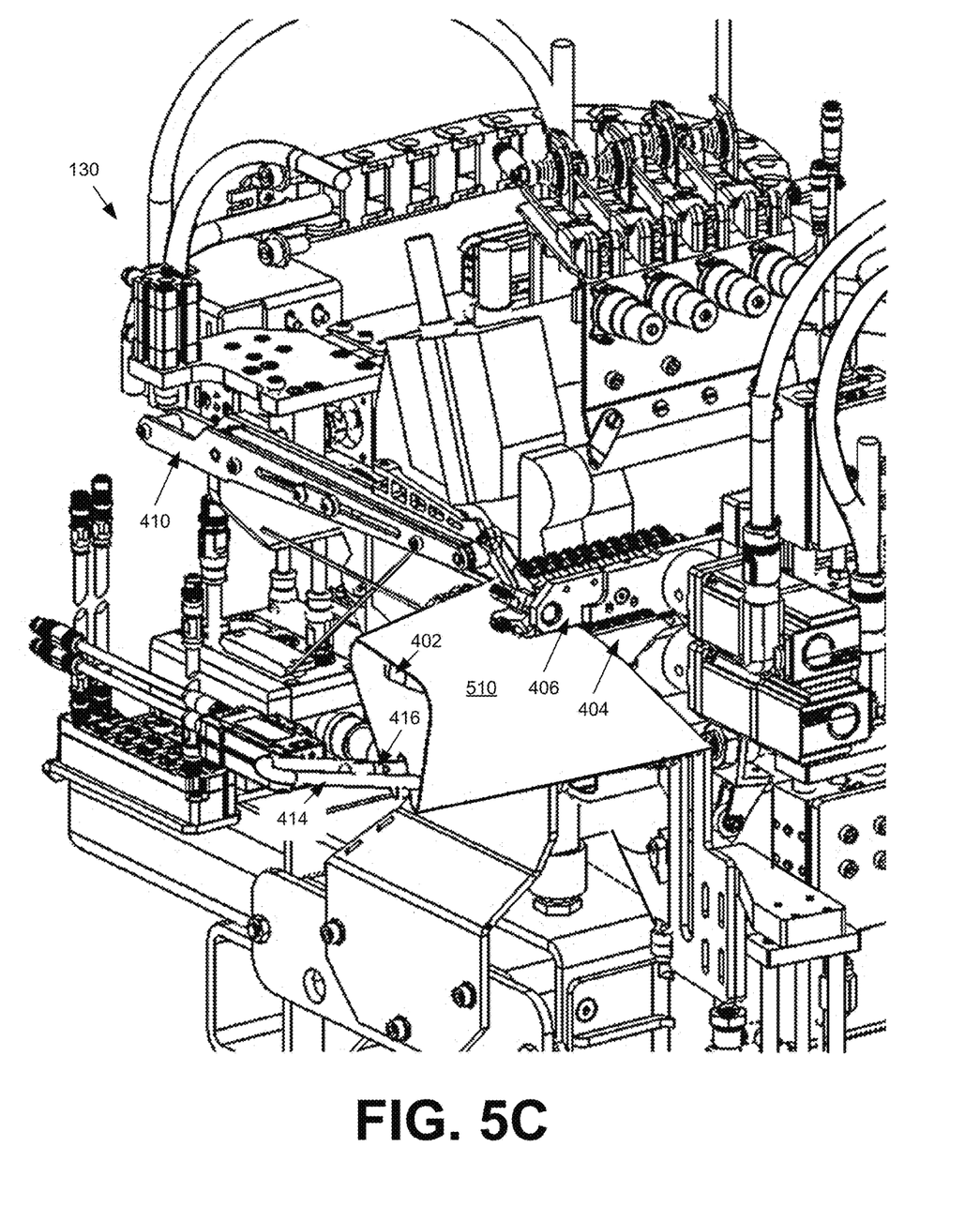
Figure 5D:
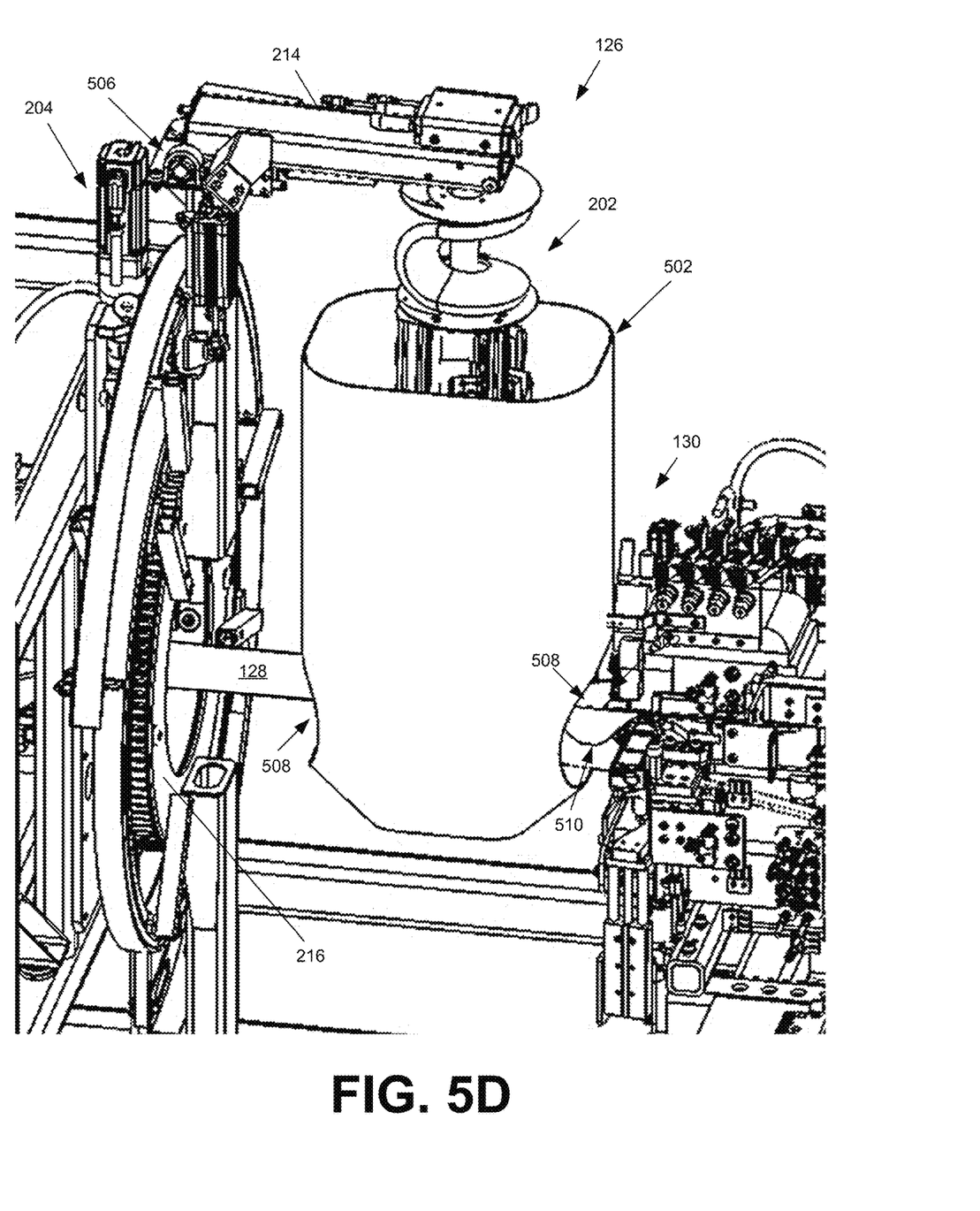

In addition to loading a garment 502, a sleeve band or other garment band is loaded on the band positioning system 130 as shown in FIG. 5C. For example, the sleeve band 510 can be loaded over the band guide 402 and upper guide bar 414 manually by an operator or user or automatically by a garment manipulator 116. As the sleeve band 510 is advanced, the bottom ply aligner 404 can engage the material of the band 510 and pull it into position over the band guide 402. The band guide 402 can include air jets or orifices configured to direct air toward the sleeve band material as it is advanced over the band guide 402. The belt puller 410 can be used to move the sleeve band 510 into the position on the side of the band guide 402 opposite the bottom and top ply aligners 404 and 406. The belt puller 410 can be extended outward away from the joining device 118, rotated downward to contact the sleeve band material, and retracted back toward the joining device 118 to move the sleeve band onto the band guide 402.

When the sleeve band 510 includes a seam, it can be positioned on the band guide 402 for proper alignment with the garment opening 508. A band seam detector can include a sensor that can detect the seam in the band as it passes by the sensor. Rotation of the sleeve band 510 around the band guide 402 can be controlled (e.g., via the belt puller 410) to position the seam at a desired location. When the sleeve band 510 is in the desired position, the lower collapsing bar 416 moves upward toward the upper guide bar 414, catching the sleeve band material hanging below the band guide 402 and causing it to collapse against the upper guide bar 414 thereby reducing the cross-sectional area of the sleeve band 510 as shown in FIG. 5C. It this condition, the collapsed sleeve band 510 can be inserted into the opening 508 of the garment 502.

With the garment 502 loaded on the body holder 202 and the sleeve band 510 (or other garment band) loaded about the band guide 402 and collapsed by the lower collapsing bar 416, the relative position between the garment holding system 126 with the body mandrel 128 extending through the garment openings 508 and the band positioning system 130 is adjusted so that collapsed sleeve band 510 is inserted through the garment opening 508 shaped by the body mandrel wings 302. The insertion of the sleeve band 510 through the garment opening 508 can be accomplished by advancing the garment holding system 126 towards the band positioning system 130, by advancing the band positioning system 130 toward the garment holding system 126 or by advancing both towards each other.

As the sleeve band 510 moves into the opening 508, the garment material around the opening 508 is guided over the sleeve band 510 and band guide 402 by the body mandrel wings 302. The top ply aligner 406 and the belt puller 410 can assist in moving the edge of the opening 508 into position with respect to the edge of the sleeve band 510. The top ply aligner 406 can be used to mover the garment material on the ply separator 408 (FIG. 4) and belt puller 410 can be used to move the garment material on the control surface of the body mandrel wing 302. Once the garment 502 and sleeve band 510 are in the desired position, the lower collapsing bar 416 can be retracted to release the sleeve band 510 allowing unrestricted rotation during joining. The sleeve band 510 can then be joined to the garment as previously described.

Functioning of the band attachment module 124 of the robotic system 102 will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
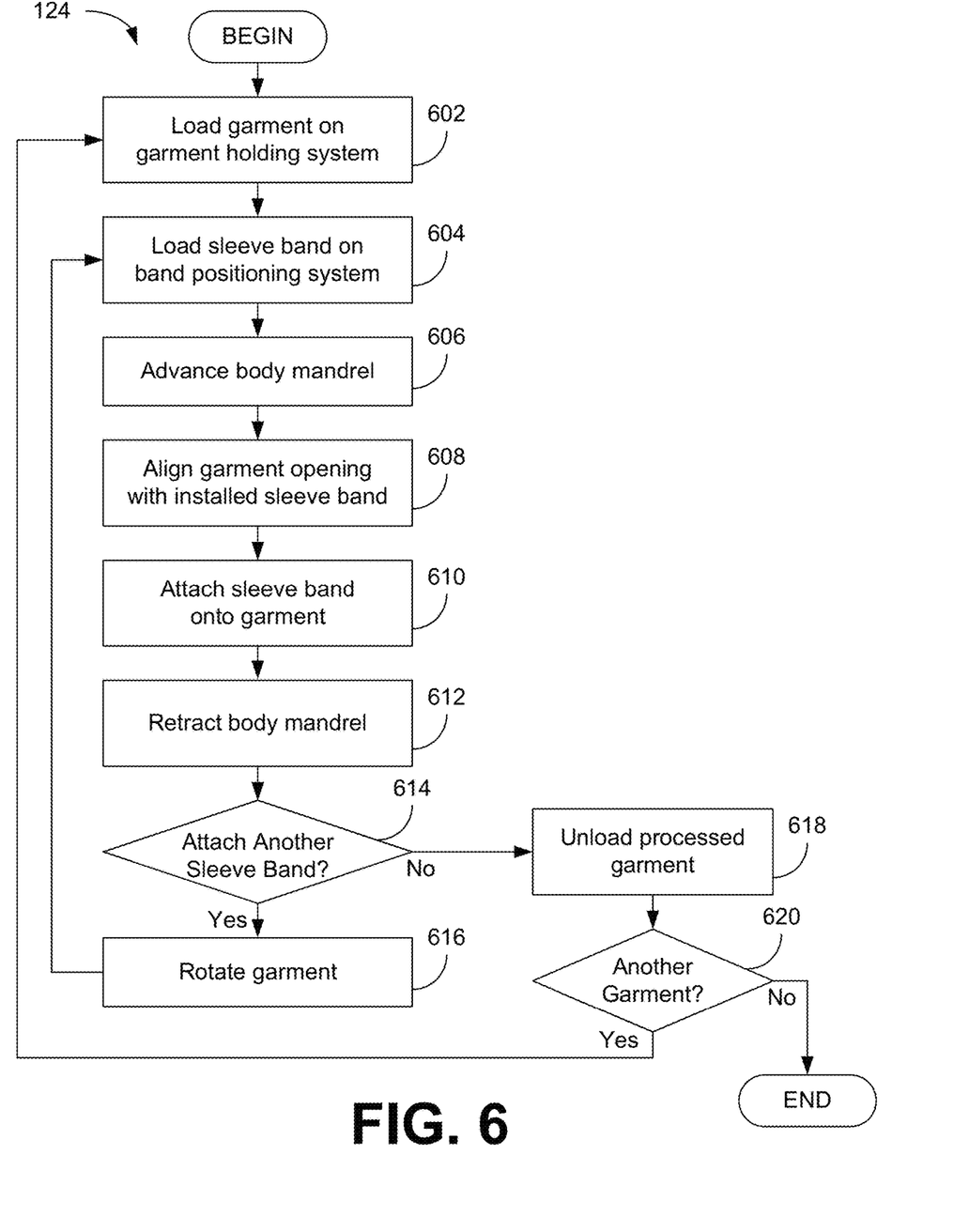
FIG. 6 illustrates an example of a band attachment module, according to various embodiments of the present disclosure.

The flow chart of FIG. 6 shows the architecture, functionality, and operation of a possible implementation of the band attachment module 124 (FIG. 1). The process begins at 602 where the garment is loaded on the body holder 202 of the garment holding system 126 (FIG. 2). The garment can be loaded over the body section 206 and body supports 210 and the wings 208 extended to hold the garment in position. The body supports 210 can be adjusted to tension the garment material and hold the openings in position for insertion of the body mandrel 128 (FIG. 2). The installation of the garment on the garment control system 128 can be accomplished manually by an operator or user, or can be automated using, e.g., an industrial robot with an end effector. The loading of the garment on the body holder 202 can be automatically initiated or can be initiated through an HMI 108 by an operator or user. In some embodiments, the rotary arm 214 can be pivoted to provide access to the body holder 202.

At 604, a sleeve band can be loaded on the band positioning system 130 (FIG. 4). For example, the sleeve band can be loaded over the band guide 402 and moved into position using, e.g., the bottom ply aligner 404 and belt puller 410. A seam in the sleeve band can be placed at a desired location for attachment to a garment. A band collapser 412 can be used to remove sagging of the sleeve band and reduce the cross-section for insertion into the garment opening. The placement of the sleeve band onto the band positioning system 130 can be accomplished manually by an operator or user, or can be automated using, e.g., an industrial robot with an end effector. The loading of the sleeve band on the band guide 402 can be automatically initiated or can be initiated through an HMI 108 (FIG. 1) by an operator or user.

The body mandrel 128 can then advance through the sleeve openings of the garment on the body holder 202 at 606. Advancement of the body mandrel 128 can be automatically initiated or can be initiated through an HMI 108 by an operator or user. As the distal end of the body mandrel 128 extends through the opposite opening in the garment, the body mandrel wings 302 can be unfolded. The body mandrel wings 302 axially extend and rotate outward to engage with the opening of the garment to allow for insertion of the sleeve band. At 608, the garment opening can be aligned with the loaded sleeve band by advancing the joining device 118 and band positioning system 130, the body holding system 126 and body mandrel 128, or both, toward each other. The belt puller 410 can position the edge of the garment material on the body mandrel wings 302 for alignment with the edge of the sleeve band. The garment opening can then be advanced for alignment with the sleeve band by the band positioning system 130 as previously discussed. Air jets can be used to ensure that the garment material extends through the opening of the garment and to maintain tension for joining by the joining device 118. Air jets can also prevent curling of the material and maintain flow of the material through the joining head. Positioning of the edge of the garment opening can be detected and controlled using an edge sensor.

The garment can then be attached to the sleeve band at 610. For example, the band and garment edge can be feed through a joining head at a speed controlled by a feed dog of the joining device 118. The speed of the belt puller 410 can be controlled to manage the sleeve band and garment materials after they have been joined. The bottom and top ply aligners 404 and 406 in contact with the sleeve band and the garment material on opposite sides of the ply separator 408 to control the position of the edges as the garment and sleeve band are advanced for attachment. Positioning of the edges of the garment opening and sleeve band as they are advanced can be detected and controlled using edge sensors of the band positioning system 130. The belt puller 410 in contact with the garment material can be used to eliminate bunching of the garment material after attachment.

As the band is attached to around the garment opening, the garment is rotated about the body mandrel 128 by the rotary axis assembly 204. After the sleeve band and garment are joined by the joining device 118, the body mandrel 128 can be retracted from the garment at 612 and the rotary axis assembly 204 can rotate to return the garment on the body holder 202 to its original orientation. If it is determined at 614 that that another sleeve band needs to be attached to the garment, then the body holder 202 is rotated about its longitudinal axis at 616 to position the other garment opening for attachment to a sleeve band. The flow then returns to 604 where the sleeve band is loaded on the band positioning system 130 for attachment as previously discussed with respect to 604 through 612.

If it is determined that another sleeve band is not to be attached, the processed garment can be unloaded at 618. The unloading of the garment from the body holding system 126 can be accomplished manually by an operator or user, or can be automated using, e.g., an industrial robot with an end effector. If a sleeve band is to be attached to another garment at 620, then the flow returns to 602 where the garment can be loaded on the body holding system 126 for attachment of one or more sleeve bands. Otherwise, the process can end.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A robotic system, comprising:
   a joining device;
   a garment holding system comprising a garment holder configured to receive a garment;
   a band positioning system comprising a band guide configured to receive a band; and
   processing circuitry comprising a processor, wherein execution of a band attachment module:
   positions, by the garment holding system, an opening of the garment over the band positioned on the band guide for attachment to the garment by the joining device, where edges of the opening of the garment and the band are controlled with ply aligners of the band positioning system; and
   attaches the band to the garment along the edge of the opening, where positions of the edge of the band and the edge of the opening are maintained by the ply aligners during attachment.

2. The robotic system of claim 1, wherein the band positioning system is configured to receive the band over the band guide and adjust position of the band on the band guide for attachment.

3. The robotic system of claim 2, wherein the position of the band on the band guide is adjusted on the band guide by at least one of the ply aligners.

4. The robotic system of claim 3, wherein the band positioning system is configured to receive the edge of the garment and adjust position of the edge of the garment over the band for attachment by another one of the ply aligners.

5. The robotic system of claim 2, wherein the position of the band on the band guide is adjusted by a belt puller of the band positioning system.

6. The robotic system of claim 1, wherein the ply aligners comprise a bottom ply aligner configured to adjust position of the edge of the band during the attachment to the garment and a top ply aligner configured to independently adjust position of the edge of the garment opening during the attachment.

7. The robotic system of claim 6, wherein the bottom and top ply aligners are positioned on opposite sides of a ply separator.

8. The robotic system of claim 7, wherein the band is between the bottom ply aligner and the ply separator and the edge of the garment is between the top ply aligner and the ply separator.

9. The robotic system of claim 7, wherein the adjustment by the ply aligners is based upon indications from edge sensors configured to independently monitor the position of the edge of the band and position of the edge of the garment.

10. The robotic system of claim 1, wherein the garment holding system comprises a body holder configured to support the garment during positioning of the opening of the garment over the band and attachment of the band to the garment.

11. The robotic system of claim 10, wherein the opening of the garment is held open during positioning over the band by a body mandrel extending through the garment.

12. The robotic system of claim 11, wherein body mandrel wings at a distal end of the body mandrel secure the opening of the garment in an open position for the insertion of the band through the opening of the garment during positioning over the band.

13. The robotic system of claim 12, wherein the body mandrel wings extend outward to engage with the opening of the garment, wherein a curvature of the body mandrel wings controls opening size and shape for insertion of the band through the opening.

14. The robotic system of claim 12, wherein the body mandrel is inserted through a second opening of the garment and extends through the garment to secure the opening to align the body mandrel wings with the opening of the garment.

15. The robotic system of claim 14, wherein the body holder is configured to tension the garment thereby stabilizing the openings of the garment for insertion of the body mandrel through the second opening and alignment of the body mandrel wings in the opening of the garment.

16. The robotic system of claim 11, wherein the body holder rotates the garment around the body mandrel during attachment of the band about the opening of the garment.

17. The robotic system of claim 16, wherein the garment holding system comprises a rotary actuator supporting the body holder, the rotary actuator configured to rotate the body holder about the body mandrel.

18. The robotic system of claim 1, comprising a band collapser configured to reduce a cross-sectional area of the band for insertion through the opening of the garment.

19. The robotic system of claim 18, wherein the band collapser comprises a guide bar adjacent to the band guide and a collapsing bar on a side of the guide bar opposite the band guide, the collapsing bar configured to collapse the band against the guide bar.

20. The robotic system of claim 19, wherein the collapsing bar moves through the guide bar thereby producing a reduced cross-sectional area of the band by folding the band about the guide bar.

\* \* \* \* \*